UNITED STATES PATENT OFFICE.

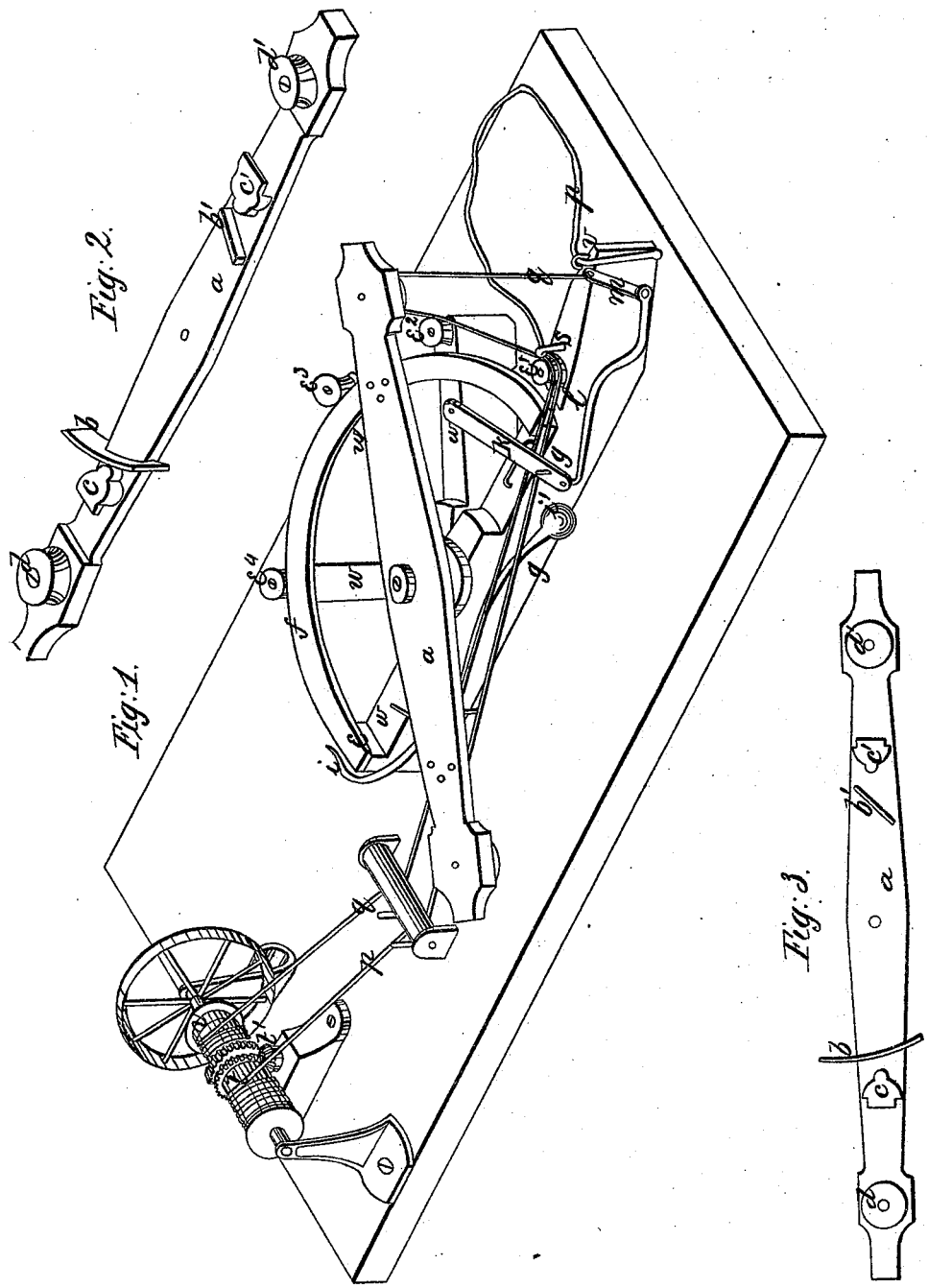

JONATHAN F. BARRETT, OF NORTH GRANVILLE, NEW YORK.

HORSE-POWER.

Specification of Letters Patent No. 5,348, dated October 30, 1847.

*To all whom it may concern:*

Be it known that I, JONATHAN F. BARRETT, of North Granville, in the county of Washington and State of New York, have invented a new and Improved Machine for Horse Powers on Machines; and I do hereby declare the following to be a full, clear, and exact description of the same, reference being had to the annexed drawings, making a part of this specification, in which—

Figure I is a perspective view of the machine, showing construction. Fig. II is a perspective view of the under or lower side of the pawl. Fig. III is a plan of the pawl, showing the parts on its underside.

The nature of my invention consists in the provision of ropes to act upon a set of pulleys combined as described, with the sweep and other parts, for operation, and by which I effect the important objects of saving a material part of the friction required in other horse power machines.

To enable those skilled to make and use my invention, I will describe its construction and operation, as follows.

I provide a sweep, ($a$), as seen in all the figures in the drawings; and this sweep has several attachments upon its under or lower side, when it is placed for work in the machine; these attachments will be seen in Figs. II and III, and may be known as ($b$ and $b'$) which act upon the several parts for engaging and disengaging the cords, each alternately performing its part as hereafter more fully set forth, and two sweep guides ($c, c'$) each of which are alike and perform alike to guide properly the sweep in its revolution by catching upon the segment curve. The sweep also has upon it, the pulleys ($d$ and $d'$), each of which are similar and perform alike to take up the cords at the proper times, each alternately. The sweep, ($a$), is a piece, hung by a pivot at the center, and is of the common construction of sweeps; and this is to be used to hitch the horse or cattle for giving motion to the machine. The sweep is placed over a suitable set of timber work, which for convenience may be connected at the center and radiate outward the required distance; these radial timbers may be known as ($w$), and upon these is planted in suitable manner, the segment curve, or semicircular ring; and outside of this ring or segment curve, are placed friction pulleys, so as to receive the cords as they are passing around in order to keep the cords properly tight, until they are relieved by being thrown off at ($i$), these pulleys are known as ($e^1\ e^2\ e^3\ e^4$); the semicircular segment is known as ($f$) and upon this the sweep rests, and the hooks ($c, c'$) catch to support and keep steady the sweep while the same end of it is in contact with the cord, or working end. The front or straight side of this timber work, ($g$), serves the additional purpose of connecting by attachments, the parts which in connection with the pulleys ($d$ and $d'$) engage and disengage the ropes ($p$ and $q$). A disengaging lever ($i$ to $i'$) is set to act upon a fulcrum placed upon ($g$), and has upon one of its ends a weight or counter balance ($i''$), and at the opposite end, or ($i$), is formed into a cam of a proper shape to disengage the ropes from either of the pulleys ($d$ or $d'$) on the arrival at this point; the same being operated by the sweep as it acts upon the cam ($i$), which by its shape, slips over the belt on the end of the pulley nearest to its point, so as to take the top of the rope or belt and press it down until it is thrown off the pulley and is disengaged therefrom; by such throwing off. The pressing down of ($i$) is performed by the sweep and the cam ($i$), is again returned to its proper position by the counter balance ($i''$), so that it may throw off in like manner the belt at the return of the end of the sweep with a cord upon its pulley, which cord may be either ($p$ or $q$) as they alternately come here to be thrown off or disengaged.

The engaging apparatus may be as follows: The lever ($k$) puts the rope ($p$) in a proper position to be engaged by the proper pulley and is drawn back by the cam ($b'$) during the winding up of the rope ($p$) so as to be ready for the next operation; ($k$) has its fulcrum at ($w$), and is at its opposite end attached to the connecting rod ($l$), and this to the middle of a vibrating lever ($m$), which has its fulcrum at its lower end and at its upper end is connected with and carries the cord to be engaged or operated. The lever ($k$) is a vibrator and is actuated by the two cams ($b$ and $b'$) (affixed to the sweep) alternately; ($b$) throwing the lever ($m$) with the rope ($q$) forward in position for it to be engaged by the pulley ($d'$) and ($b'$) gives it the reverse motion for the purpose of laying the rope $q$ snug set to the stud $s$, in the proper time with and out of the way of the other rope and parts of the machine; that is to say, this takes place when the other end of the sweep is about over the pulley ($e^4$). Thus, it will be understood that by the sweep and its cams ($b$ and $b'$) the lever ($k$) is so placed that each cord will be sure to be caught by the pulleys ($d$ and $d'$) in regular succession. Of the ropes, which may be of any material which will yield to the requisite extent; that is, of ropes, belts, chains, etc., two are required, and are ($p$ and $q$) in the drawings. The first, or ($p$) is made fast to a permanent staple ($r$) and passes between the guide stud ($s$) and the lower groove of the pulley ($e'$); and then passes to one of the main drums ($t$); the second or ($q$) has one end attached to the vibrating lever ($m$), and passes between the same stud ($s$) and the upper groove of the pulley ($e'$) onward to the other main drum ($v$). The drums or pulleys ($t$ and $v$) are material parts of the apparatus, and are both placed upon the shaft, as well as is the fly-wheel; each drum running free upon the shaft ($o$), and in contrary direction to the shaft, while the respective rope on each is drawn off by its engaging pulley, but travels with the shaft when the cord is wound up on each respectively, by the action of an engaging pawl, each of the ropes in turn; and each of the drums having a circular motion of a reciprocating character; that is, a letting off and taking on of rope alternately, one and the other. Each of these main drums has a beveled wheel on their inner ends and these wheels are connected by a third or an independent beveled wheel, which connects the two and causes each to be sure and take their respective and opposite directions precisely as the cord engaged by the pulley on the sweep directs. Both these drums ($t$ and $v$) act alternately upon and drive the shaft ($o$) with the fly-wheel, and are so geared to the beveled wheel ($t'$) by means of pawls and ratchets placed within caps on their outside ends so as to allow the continued onward motion, in one direction of the fly-wheel and shaft, while one of the drums is each on the backward or reversed motion to its shaft ($o$) by running loose upon it, the shaft ($o$), until the drum reverses motion, when the pawl acts to drive the shaft. Other equivalents may be substituted to drive instead of the pawls, and produce a like result. Thus one drum is always driving and one loose on the shaft, except at the instant of changing motion; and each alternately becomes a driver in place of the other, as the cords run out and return giving such motions to these drums; that is the alternate backward and forward motions.

While I intend to use this machine with horses for power to drive it, also cattle may be used or even other powers may be applied in combination to produce a good result.

The operation may be understood as follows: One, or any other number of horses or other power may be applied or attached to the sweep in any suitable way; and, thereby the sweep is put in revolution and catches the cords successively upon the pulleys ($d$ or $d'$) and brings them one at a time, to the disengaging cam ($i$), where they are successively thrown off and are allowed to be drawn back and wound up successively upon their respective drums. About the time of disengaging one of these ropes ($p$ or $q$) the other is engaged by the pulley on the other end of the sweep, and thus by one rope the other is drawn back through the action of the independent beveled wheel, and wound upon its own drum. These motions are alternately repeated as often as the length of either cord is run out by one of the pulleys on the sweep, the rope being immediately though indirectly taken up by the other. The main drums in this way receive their respective motions, and the drum on which the rope is being wound up conveys the motion to the shaft upon which the fly or bandwheel is hung giving to its the continuous straight forward circular motion. The pawls or spring dogs, before referred to are used to give the motion to the onward drum and freedom to the other in its reversed motion, but as other well known mechanical equivalents may be used to allow the same motion of the two drums I do not claim these pawls and ratchets for the purpose of reversing the motion of the drums, but I claim as follows.

What I claim as my invention, and desire to secure by Letters Patent, is—

The combination and arrangement of the sweep with the semicircle and other arrangements for letting off and taking on the belts, as well as the combination of these parts with the belts and drums, inclusive of their several operations as herein fully set forth and described, for the purpose of a horse or other power, whether the same be effected by these precise means, or by mechanical equivalents producing substantially the same result.

JONATHAN F. BARRETT.

Witnesses:
J. L. KINGSLY,
R. F. BERWICK.